United States Patent
Alandí Escrig et al.

(10) Patent No.: US 12,029,932 B2
(45) Date of Patent: Jul. 9, 2024

(54) MIXTURE OF NON-POLYMER ORGANIC COMPONENTS WITH FIRE RETARDANCY, PREPARATION METHOD AND USE

(71) Applicants: PRIMALCHIT SOLUTIONS, S.L., Valencia (ES); Francisco Antonio Alandí Escrig, Sagunto (ES); CONSEJO SUPERIOR DE INVESTIGACIONES CIENTÍFICAS (CSIC), Madrid (ES); UNIVERSITAT POLITÈCNICA DE VALÈNCIA, Valencia (ES)

(72) Inventors: Francisco Antonio Alandí Escrig, Sagunto (ES); Abdessamad Grirrane Tayari, Valencia (ES); Hermenegildo García Gómez, Valencia (ES); Juan Llobell Lleó, Valencia (ES); Regina García Mondria, Valencia (ES)

(73) Assignees: PRIMALCHIT SOLUTIONS, S.L., Valencia (ES); Francisco Antonio Alandi Escrig, Sagunto (ES); CONSEJO SUPERIOR DE INVESTIGACIONES CIENTÍFICAS, Madrid (ES); UNIVERSITAT POLITÈCNICA DE VALÈNCIA, Valencia (ES)

(*) Notice: Subject to any disclaimer, the term of this patent is extended or adjusted under 35 U.S.C. 154(b) by 0 days.

(21) Appl. No.: 17/790,014

(22) PCT Filed: Dec. 29, 2020

(86) PCT No.: PCT/ES2020/070826
§ 371 (c)(1),
(2) Date: Jun. 29, 2022

(87) PCT Pub. No.: WO2021/136859
PCT Pub. Date: Jul. 8, 2021

(65) Prior Publication Data
US 2023/0045206 A1    Feb. 9, 2023

(30) Foreign Application Priority Data
Dec. 31, 2019  (ES) .............................. ES201931175

(51) Int. Cl.
*A62D 1/06*  (2006.01)
*A62D 1/00*  (2006.01)
(Continued)

(52) U.S. Cl.
CPC ............. *A62D 1/06* (2013.01); *A62D 1/0007* (2013.01); *A62D 1/0035* (2013.01); *C09K 21/06* (2013.01)

(58) Field of Classification Search
None
See application file for complete search history.

(56) References Cited

U.S. PATENT DOCUMENTS 2,389,415 A * 11/1945 D Alelic ............... C08G 12/046
                                                             528/262
2,389,416 A * 11/1945 D Alelio ................ C07G 99/00
                                                             528/265
(Continued)

FOREIGN PATENT DOCUMENTS

CA        2052887 A1    4/1992
CN      101716408 A     6/2010
(Continued)

OTHER PUBLICATIONS

CN 109593831 A (English Language Abstract). (Year: 2019).*
(Continued)

*Primary Examiner* — Joseph D Anthony
(74) *Attorney, Agent, or Firm* — The Webb Law Firm

(57) ABSTRACT

A pyrophosphate-free mixture with fire retardancy, including a mixture of non-polymer organic components, wherein
(Continued)

at least a first compound of the mixture acts as a hydrogen-bridge donor and at least a second compound of the mixture acts as a hydrogen-bridge acceptor. The disclosure also relates to a method for preparing the fire-retardant mixture and to the use thereof as a fire retardant in extinguishing forest fires.

3 Claims, 2 Drawing Sheets

(51) Int. Cl.
    *C09K 21/06*     (2006.01)
    *C09K 21/10*     (2006.01)
    *C09K 21/12*     (2006.01)

(56) References Cited

U.S. PATENT DOCUMENTS

| | | | | |
|---|---|---|---|---|
| 4,647,694 | A * | 3/1987 | Hosztafi | C07D 233/78 |
| | | | | 562/443 |
| 7,579,426 | B2 * | 8/2009 | Grigsby, Jr. | C07C 217/08 |
| | | | | 528/85 |
| 7,608,570 | B2 * | 10/2009 | Tomarchio | C11D 3/162 |
| | | | | 510/491 |
| 8,835,595 | B2 * | 9/2014 | Oda | C08G 69/36 |
| | | | | 528/346 |
| 8,859,429 | B2 * | 10/2014 | Ono | C09G 1/02 |
| | | | | 438/693 |
| 9,974,992 | B2 * | 5/2018 | Zhang | A62D 1/06 |
| 2014/0113984 | A1 * | 4/2014 | Burdeniuc | C08J 9/02 |
| | | | | 521/131 |
| 2014/0183399 | A1 | 7/2014 | Yao et al. | |
| 2018/0177697 | A1 * | 6/2018 | Gebert-Schwarzwaelder | |
| | | | | A61K 8/347 |
| 2019/0083372 | A1 * | 3/2019 | Goutsis | A61Q 5/10 |

FOREIGN PATENT DOCUMENTS

| | | |
|---|---|---|
| CN | 103274626 A | 9/2013 |
| CN | 103463790 A | 12/2013 |
| CN | 103788407 A | 5/2014 |
| CN | 105013125 A | 11/2015 |
| CN | 105963897 A | 9/2016 |
| EP | 2742978 A1 | 6/2014 |
| KR | 20120051449 A | 5/2012 |
| WO | 2014153140 A1 | 9/2014 |
| WO | 2015104004 A1 | 7/2015 |
| WO | 2018022763 A1 | 2/2018 |

OTHER PUBLICATIONS

CN 1958569 A (English Language Abstract). (Year: 2007).*
CN 104498914 A (English Language Abstract). (Year: 2015).*
CN 109799335 A (English Language Abstract). (Year: 2019).*

* cited by examiner

MIXTURE OF NON-POLYMER ORGANIC COMPONENTS WITH FIRE RETARDANCY, PREPARATION METHOD AND USE

CROSS-REFERENCE TO RELATED APPLICATIONS

This application is the United States national phase of International Application No. PCT/ES2020/070826 filed Dec. 29, 2020, and claims priority to Spanish Patent Application No. P201931175 filed Dec. 31, 2019, the disclosures of which are hereby incorporated by reference in their entirety.

BACKGROUND OF THE DISCLOSURE

The disclosure relates to fire-retardant (or combustion-retardant) compounds and mixtures which can be used in open spaces for controlling and extinguishing massive fires. The disclosure also relates to a preparation method, as well as the use of said mixtures in extinguishing fires.

DESCRIPTION OF RELATED ART

The fire retardants used today for extinguishing fires are mainly inorganic phosphorus and nitrogen compounds. Particularly, a combustion-retardant formulation (FIRETROL), which is the most widely used for extinguishing forest fires worldwide, is available on the market today. Although the effectiveness of this formulation has been proven, the fundamental component of the formulation are pyrophosphates which, due to their non-biodegradable nature, end up accumulating in aquifers and causing eutrophication effects as a result of their activity which favours algae and plant growth, particularly at the high concentrations they may reach in waters as a result of fire extinguishing tasks. Unlike this formulation, the present disclosure describes mixtures of compounds that are innocuous or have a very low toxicity as they are biodegradable, and which act as fire retardants.

There are also numerous organic compounds for which the combustion-retardant or combustion-extinguishing capacity has been determined. Fire retardant effect is understood as the capacity of some compounds or mixtures to inhibit the combustion of a combustible material by coating the surface thereof, extinguishing the fire or causing the fire front to progress more slowly than in the absence thereof.

Among the non-polymer organic compounds used for extinguishing fires, one type intended for general use is those compounds having halogens in their composition.

In that sense, for example, application CA2052887 relates to a composition with combustion-retardant capacity comprising at least one compound selected from isomers of dichloropentafluoropropane.

Additionally, application WO2015104004 relates to a composition with combustion-extinguishing capacity comprising a carboxylic acid derivative and a pyrotechnic agent.

Most non-halogenated organic compounds are flammable and do not have fire-retardant activity. Some types of organic compounds used for extinguishing fires are halogenated compounds which can generate highly toxic gases during the transformation thereof, in addition to exhibiting extremely adverse effects for the environment. In that sense, for example, chlorinated compounds generate phosgene which is a highly toxic compound in a certain percentage. The brominated variety is the most widely used among marketed fire retardants. These organic brominated components are very effective on plastics, textiles, electronics, clothing, and furniture, but have the drawback of being highly neurotoxic compounds, which is why they are not used as fire retardants in forest fires.

The present disclosure arises from the unexpected and unpredictable result of the fire retardancy of mixtures of two or more flammable organic compounds. This unexpected activity results from the self-assembly and the formation of sufficiently strong hydrogen-bridge bonds between the components of the mixture. This strong interaction makes the combustion process endergonic, allowing fire to be extinguished, forming the basis of the object of the present disclosure.

SUMMARY OF THE DISCLOSURE

The first object of the disclosure relates to a pyrophosphate-free mixture or composite with fire retardancy which is not based on the use of polymer materials and is suitable to be used for extinguishing fires (preferably, forest fires), characterised in that it comprises a mixture of non-polymer organic components presenting biodegradability and a low toxicity, wherein:
  a. at least one of the components of the mixture acts as a hydrogen-bridge donor, being preferably selected from a group consisting of dicyandiamide, urea, malonic acid, glycerol, guanidine, 1,1-dimethylurea, oxalic acid, ethylene glycol and derivatives, trifluoroacetamide, 1-methylurea, imidazole, 1,3-dimethylurea, lactic acid, resorcinol, 2-imidazoline, arginine, benzoic acid, benzyl alcohol, propylene urea, thiourea, 4-hydroxybenzoic acid, succinic acid, acetamide, benzamide, levulinic acid, gallic acid, ammonium formate, tartaric acid, malonic acid and derivatives, adipic acid, oleic acid, linoleic acid, stearic acid, trimyristin, citric acid and isocitric acid, as well as any of the combinations thereof;
  a. at least one of the components of the mixture acts as a hydrogen-bridge acceptor, being preferably selected from a group consisting of lidocaine or an ester-type derivative, proline, histidine, nicotinic acid, (phenylmethyl)triphenylphosphonium chloride, alanine, methyltriphenylphosphonium bromide, glycine, ethanolamine, betaine, ammonium formate and ammonium oxalate, as well as any of the combinations thereof.

Preferably, the molar ratio of the hydrogen-bridge donor and acceptor compounds may vary from 1:5 to 5:1.

Surprisingly and in a manner that cannot be deduced by one skilled in the art, it has been proven that the mixture of two or more non-polymer organic compounds which may be flammable individually (as described previously) gives rise to a mixture with combustion retardant properties due to the formation of strong hydrogen bridges which increase their thermodynamic stability, to the point where the flammability thereof disappears, acting for this reason as combustion retardants.

This binding or self-assembly of the components of the mixture occurs spontaneously, giving rise to a supramolecular aggregate which can be characterised as an entity different from that of its individual components, based on the properties thereof. The origin of self-assembly is the establishment of a strong intermolecular interaction which keeps the components of the mixture bound to one another. In the present disclosure, the interaction which is established as the origin of self-assembly and is therefore responsible for the fire retardant effect is the hydrogen bridge interaction.

These interactions between hydrogen-bridge donor and hydrogen-bridge acceptor reduce the entropy difference of the phase transition and increase the stability of the aggregate with respect to the stability of its individual components. The strength of hydrogen bonds is related with the phase transition temperature, the thermodynamic stability, and other properties of the mixture. The present disclosure reveals that these strengths can become so intense that they put the combustion enthalpy of the aggregate at a disadvantage with respect to that of its individual components.

Together with the fire-retardant activity of the mixture, other criteria fulfilled by the components of the mixture are:
- exhibiting minimal negative effects on vegetation and ecosystems at concentrations that can be reached in the case of being used for extinguishing forest fires;
- biodegradability, such that they do not persist indefinitely in the environment;
- water solubility and/or a short persistency in an aqueous medium. This is a key aspect, since it is a universal solvent for extinguishing fires. Given that the origin of self-assembly of the fire retardant effect is the hydrogen bridge interaction, the components of the mixture are water soluble. Moreover, self-assembly is not observed in this medium since the interaction of each component with water prevails. Nevertheless, when water evaporates, due to their low boiling point, the components of the mixture recognise one another and, at this point, cause the desired retardant effect. For this reason, the self-assembly mixture cannot be considered to be present in an aqueous medium, said mixture being formed as water evaporates.

Other desirable properties include a widespread availability and low cost, stability, and ease of handling.

A large diversity of possible combinations of starting components can be found among the strong interactions which are capable of altering combustion enthalpy. This large diversity of options constitutes a significant advantage as it allows controlling the physical and phase properties of the self-assembly mixtures. These properties include, among others, the capacity to dissolve solutes of very different nature.

In this manner, in particular embodiments of the disclosure, the mixture may comprise at least one additional additive which can be preferably selected from a group consisting of:
a. water, preferably in a percentage comprised between 50% and 95%;
b. at least one organic or inorganic compound with acidic or basic chemical properties, preferably in a percentage equal to or less than a 30% by weight with respect to the total of the mixture. In the preferred embodiments of the disclosure, the acidic additive will be selected from a group consisting of hydrochloric acid, sulfuric acid, sulfonic acid, carbonic acid and carboxylic acid, as well as any of the combinations thereof. A carbonate or bicarbonate of an alkali metal, alkaline earth metal, preferably selected from a group consisting of sodium, potassium, magnesium, and calcium, as well as ammonium carbonate, will preferably be used as a basic additive. These additives can be pure or dissolved in an aqueous medium and allow the pH value of the self-assembly mixture and of the corresponding aqueous solutions to be adjusted to about almost neutral values and, preferably, in the interval of between 5 and 9. The final pH value may depend furthermore on the nature of the ground where the retardant will be used;
c. at least one solid compound on which the mixture is impregnated. Preferably, said solid compound can be selected from a group consisting of clays (preferably selected from montmorillonite, sepiolite, and kaolin) and agricultural waste (preferably straws from agricultural crops such as rice, wheat, barley, and tigernut, among others), as well as any of the combinations thereof (such as adobe, for example). In the preferred embodiments of the disclosure, the percentage of the retardant mixture impregnating the solid compound can vary between 5% and 40% by weight, and more preferably between 5% and 10% by weight;
d. at least one colouring substance or a pigment, suitable for visualising the area where the fire-retardant mixture will be applied. The pigments can be natural pigments, preferably metal oxides, and more preferably (red) iron oxides, or natural biodegradable organic colourants such as those obtained from insects, molluscs, plants, and fruits. The percentage of these colourants will preferably be less than 5% by weight and preferably less than 1%.

In this manner, as indicated, in particular embodiments of the disclosure, the mixtures can be used pure. In other embodiments of the disclosure, the mixtures can be used in an aqueous solution having a desired concentration (preferably between 5% and 10% by weight). Lastly, the mixtures can also be used supported or not supported on fire-proof solids. The water used for dissolving the mixtures with retardant effect can be fresh water or seawater.

Due to its fire retardant effect, one of the general characteristics of the mixtures herein described is that, with the individual compounds possibly being solids at room temperature, the mixing thereof causes a significant decrease of the boiling point that at times exceeds a decrease of 100° C., where it may become liquid at room temperature (about 25° C.) in many cases. This effect is due to the strong interaction established between the components of the mixture, which determines that the crystalline network of the individual components is not the most stable when mixing takes place.

In addition, the object of the disclosure relates to the preparation method for preparing mixtures of hydrogen donor and acceptor compounds. Particularly, this method may comprise preparing the mixture by simply mixing the components thereof intimately, either by means of grinding the components (when at least one is solid) together or by means of evaporating the solutions of the compounds. In some cases, a change in physical state is observed, with the mixture being a viscous liquid. This change in physical state reflects the strong interaction between both compounds which undergo self-assembly spontaneously. Any other methods of preparing the mixtures, such as melting the components and pouring one component onto the other under stirring or dissolving the components together or separately in water and subsequently mixing same is also suitable for preparing the self-assembly mixture with fire retardant properties.

In those embodiments in which the mixture is used to impregnate solids acting as a support for the mixture, said impregnation can be suitably carried out by dissolving the mixture or its components in an aqueous medium and then adding the desired amount of the solid. Then, the suspension is stirred and water is slowly evaporated through heating by means of forced air passage, by means of vacuum, or a combination of these methods. As an alternative to evaporation, the solid, once impregnated, can be recovered by filtration or centrifugation. Other suitable impregnation methods may consist of painting or spraying with aerosols, among others.

In the case of impregnating a solid material with the self-assembly mixtures with fire retardant properties, this solid material can have some other additional functionality. In that sense, when the fire retardant self-assembly mixture impregnates a rice straw, it may contain the seeds of shrubs characteristic of the forest area affected by the fire. As such, in addition to the fire retardant effect, the combined product can help to repopulate the affected forest area. Other functions of the impregnation result can be to prevent damaged ground from being entrained by heavy rains or to contain desirable nutrients or plant protection compounds.

Lastly, another object of the disclosure relates to the use of the claimed self-assembly mixtures as fire retardants for extinguishing forest fires, particularly those mixtures that furthermore fulfil the criteria of being benign to the natural environment, vegetation, and ecosystems. Moreover, combinations of widely accessible and low cost compounds are preferable.

BRIEF DESCRIPTION OF THE DRAWINGS

FIG. 1 shows a group of organic hydrogen acceptor molecules which can be used in the preparation of the self-assembly mixtures with fire retardant properties object of the present disclosure.

FIG. 2 shows a group of organic hydrogen donor molecules which can be used in the preparation of the self-assembly mixtures with fire retardant properties object of the present disclosure.

DETAILED DESCRIPTION

Figure 1:
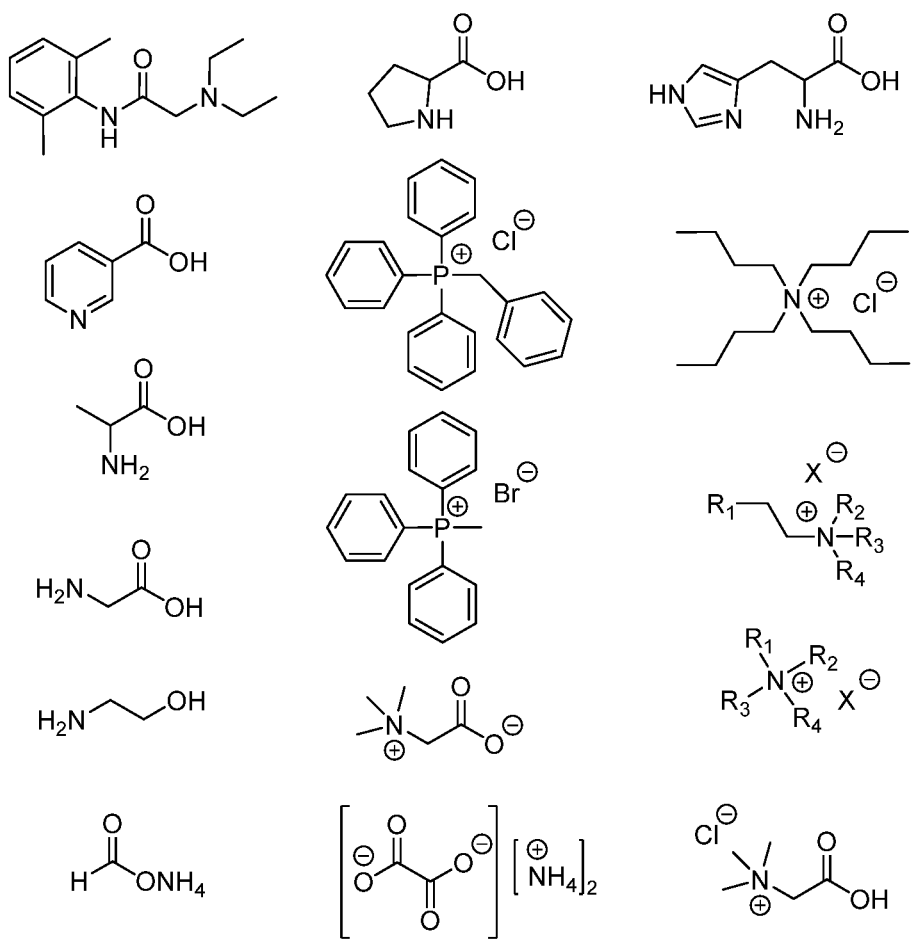
FIGS. 1 and 2 show the examples of compound structures which give rise to self-assembly mixtures with fire retardant effect, which are representative, but non-limiting, of the present disclosure.

Among the combinations of organic hydrogen bridge donor and acceptor molecules, those having the most effective fire retardant activity are those having a greater endothermic peak in the thermogravimetric profiles. The value of this endothermic peak exhibits a greater stability in self-assembly and a greater resistance to combustion. In this sense, among the most commonly used components for generating these mixtures of organic molecules which undergo self-assembly and are free of pyrophosphates, include certain aminoamides, and more preferably, lidocaine (boiling point 69° C.), which is an affordable, non-toxic, and biodegradable compound. In combination with a hydrogen donor species (HD), which must fulfil the same characteristics of biorenewability and lack of toxicity, such as urea (boiling point 133° C.), dicyandiamide (boiling point 209° C.), carboxylic acids preferably renewable carboxylic acids (oxalic acid, succinic acid, citric acid, and lactic acid, among others), amino acids, natural polyols such as glycerol and carbohydrates. Lidocaine is capable of forming, with all these compounds, non-toxic biorenewable self-assembly mixtures with low melting points (of between 0° C. and 50° C.) in some cases, which makes it possible to handle same as liquid mixtures at room temperature (between 10° C. and 35° C.).

In theory, the organic compounds undergo endothermic combustion. Lidocaine and urea are two cases of that general rule. In that sense, during the thermogravimetry analysis of lidocaine, two endothermic signals are observed, the first centered at 75° C. and the second centered at 250° C., which could be due, respectively, to moisture loss and to oxidative degradation.

Moreover, the thermogravimetry analysis of urea exhibits a two-step decomposition resulting from the sequential decomposition of $NH_2CONH_2$ reactions ($NH_2CONH_2 \rightarrow NH_3 + HNCO$ y $HNCO + H_2O \rightarrow NH_3 + CO_2$) which occur, respectively, in the temperature range of between 150° C. and 270° C. Furthermore, five endothermic signals centered, respectively, at 140° C., 220° C., 240° C., 386° C., and 407° C. are observed.

In a particular embodiment of the disclosure, the mixture can be a combination of solid lidocaine and solid urea in a weight ratio of 1 to 1, in the presence of a hydrochloric acid equivalent (37% aqueous solution). This mixture is liquid at room temperature (25° C.) and has a pH value of between 7 and 9. The impregnation of a combustible object such as wood or paper with this mixture causes said object to exhibit an unexpected fire retardant effect.

Therefore, it has been demonstrated that the combination of lidocaine and urea in the indicated ratio does not exhibit the calorimetric behaviour of the individual components, but rather gives off less combustion heat. These differences in the thermodynamics of the combustion reaction are due to the donor-acceptor self-assembly which establishes a strong interaction between both components.

In this manner, in a preferred embodiment of the disclosure, the hydrogen-bridge acceptor compounds is lidocaine or an ester-type derivative and the donor compound is dicyanamide or urea. Even more preferably, the molar ratio between them can vary between 1:1 and 1:2.

In another preferred embodiment of the disclosure, the hydrogen bridge donor compound is glycine and the acceptor compound is urea or dicyandiamide, preferably in a molar ratio which can vary between 1:1 and 1:2.

In another preferred embodiment of the disclosure, the hydrogen-bridge donor compound is ammonium formate and the hydrogen-bridge acceptor is selected from glycine, urea, and dicyandiamide. More preferably, the molar ratio of these components can vary between 1:1 and 1:2.

EXAMPLES

Non-limiting examples of the present disclosure will be described below.

Example 1

Formation of the self-assembly mixtures of lidocaine (LIC) and urea. 30 mmol (7.02 g) of lidocaine (LIC), 30 mmol (1.80 g) of urea, and 30 mmol (1.09 g) of hydrochloric acid are introduced in a 100 ml flask at room temperature. The resulting mixture is heated at 80° C. for 12 h. After said time has elapsed, the liquid 1LIC/1Urea/1HCl mixture, the approximate pH value of which is in the range of between 8 and 9, is obtained. This mixture with fire retardant effect can be used directly, can be diluted in fresh water or seawater at a concentration of about 10% or less, or is used to impregnate solid supports.

This mixture, when impregnated on a cardboard strip 2 cm wide by 10 cm long and left to dry, prevents this cardboard from burning, even when subjected to the prolonged action of fire from a blowtorch. In comparison, one and the same cardboard burns completely when fire is brought close, the cardboard catches fire, and is left to be completely consumed in the absence of the initial fire.

Example 2

Formation of the self-assembly mixtures of lidocaine and dicyandiamide (DCD). This is performed in the same manner as in Example 1 replacing the urea mass with 30 mmol (2.52 g) of dicyandiamide (DCD), using the same amounts of lidocaine and hydrochloric acid. The resulting mixture is heated at 80° C. for 10 hours. After said time has elapsed, the liquid 1 LIC/1 DCD/1 HCl mixture, the pH value of which is in the range of between 7 and 8, is obtained. This mixture with fire retardant effect can be used directly, can be diluted, or is used to impregnate solid supports.

When a cardboard strip is impregnated with this mixture and left to dry, the cardboard becomes combustion resistant even when it is subjected to fire from a blowtorch. In comparison, a strip of the same cardboard burns completely when it catches fire.

Example 3

Formation of the aqueous mixtures of lidocaine, urea, and sodium bicarbonate. This is performed according to the method and amounts indicated in Example 1, heating the mixture at 80° C. for 10 h. After said time has elapsed, a solution of 2.52 g of sodium bicarbonate (30 mmol) in 50 ml of water with a pH value of 10 is added little by little to this mixture of LIC and urea and stirred for another 2 h at 80° C. The final aqueous 1LIC/1urea/1HCl/1NaHCO$_3$ solution with fire retardant effect obtained can be used directly, can be diluted in fresh water or salt water at a concentration of about 10%, or is used to impregnate solid supports.

When a cardboard strip is impregnated with this mixture and left to dry completely, the cardboard becomes combustion resistant, where it will not catch fire from a blowtorch. In comparison, one and the same cardboard strip burns completely when it catches fire from a blowtorch.

Example 4

Formation of the aqueous solutions of lidocaine, dicyandiamide, and sodium bicarbonate. This is performed in the same manner as in Example 2, placing 30 mmol (7.02 g) of lidocaine (LIC), 30 mmol (2.52 g) of dicyandiamide (DCD), and 30 mmol (1.09 g) of hydrochloric acid in a 100 ml flask at room temperature. The resulting mixture is heated at 80° C. for 10 hours. After said time has elapsed, a solution of 2.52 g of sodium bicarbonate (30 mmol) in 50 ml of water is added little by little to the self-assembly mixture and the solution is stirred for 2 h at 80° C. Other bases which can also be used are potassium, magnesium, and calcium bicarbonate, in the corresponding weights for maintaining the molar ratio. The final aqueous 1LIC/1DCD/1HCl/1NaHCO$_3$ mixture with fire retardant effect obtained has a pH value of about 7. This mixture can be used directly, can be diluted, or is used to impregnate solid supports.

Like in the preceding examples, a combustion test for cardboard strips or wood chips comparing a sample impregnated with the 1LIC/1DCD/1HCl/1NaHCO$_3$ mixture after being left to dry demonstrates their fire retardant effect.

Example 5

Impregnation of the aqueous suspensions of lidocaine and dicyandiamide on clays. 30 mmol (7.02 g) of lidocaine (LIC), 30 mmol (2.52 g) of dicyandiamide (DCD), and 30 mmol (1.09 g) of hydrochloric acid are introduced in a 100 ml flask at room temperature. The resulting solution is heated at 80° C. for 10 h. After said time has elapsed, a solution of 2.52 g of sodium bicarbonate (30 mmol) in 50 ml of water is added to this solution little by little and under constant stirring, maintaining the stirring after completing the addition for 2 hours at 80° C. 2 g of montmorillonite are added to the aqueous solution made up of 1LIC/1DCD/1HCl/1NaHCO$_3$ and stirred for 2 h at 80° C. After this time has elapsed, water is completely evaporated by heating at 80° C. This solid can be used directly or can be pressed and ground to obtain particles with suitable dimensions, preferably of between 100 and 500 µm, for use thereof.

A synergistic effect of the combination of the soluble 1LIC/1DCD/1HCl/1NaHCO$_3$ compound mixture and montmorillonite was unexpectedly observed. This synergistic effect of the adsorption of the mixture onto montmorillonite on the fire retardant effect can be demonstrated by comparing the flame retardant effect in cardboard strips or wood chips when they are impregnated with: i) a 1LIC/1DCD/1HCl/1NaHCO$_3$ solution at a 1:2 dilution with respect to Example 4, or with ii) a suspension of 1 g of montmorillonite after being heated for 2 h at 80° C., or with iii) a suspension of Example 5 herein indicated at a 1:2 dilution, and observing that only the specimens prepared according to iii exhibit the desired retardant effect. This greater synergistic efficiency observed for the combination of 1LIC/1DCD/1HCl/1NaHCO$_3$ with montmorillonite could be due to the self-assembly of the components of the mixture which would result in new properties not found in the individual components.

Example 6

Impregnation of the mixtures of lidocaine and dicyandiamide on straws. 30 mmol (7.02 g) of lidocaine (LIC), 30 mmol (2.52 g) of dicyandiamide (DCD), and 30 mmol (1.09 g) of hydrochloric acid are introduced in a 100 ml flask at room temperature. The resulting mixture is heated at 80° C. for 10 hours. After said time has elapsed, a solution of 2.52 g of sodium bicarbonate (30 mmol), or the suitable amount of a bicarbonate of another metal, in 50 ml of water is added little by little to the preceding solution and stirred for 2 hours at 80° C. 1 g of rice straw is added to the final aqueous mixture made up of 1LIC/1DCD/1HCl/1NaHCO$_3$ and stirred for 2 hours at 80° C. The rice straw must be previously ground until obtaining particles with dimensions of less than 1 mm. After this time has elapsed, water is completely evaporated by heating at 80° C. The resulting solid can be used directly or can be suitably modified by means of pressing, grinding, and sieving, for use thereof.

The unexpected synergistic effect of the combination of the 1LIC/1DCD/1HCl/1NaHCO$_3$ mixture with straw is clearly shown when comparing the fire-retardant activity of cardboard strips or wood chip impregnated with i) a 1LIC/1DCD/1HCl/1NaHCO$_3$ solution at a 1:2 dilution with respect to Example 4, or with ii) a suspension of 0.5 g of ground straw after being heated for 2 h at 80° C., or with iii) a suspension of Example 6 herein indicated at a 1:2 dilution, and observing that only the specimens prepared according to iii exhibit the desired retardant effect. Like what has been proposed in Example 5, this greater synergistic efficiency observed for the combination of 1LIC/1DCD/1HCl/1NaHCO$_3$ with straw could be due to the self-assembly of the water-soluble components of the mixture on straw particles which would result in new properties not found in the individual components.

Example 7

Impregnation of the mixtures with fire retardant properties on clay and straw. 30 mmol (7.02 g) of lidocaine (LIC), 30 mmol (2.52 g) of dicyandiamide (DCD), and 30 mmol (1.09 g) of hydrochloric acid are introduced in a 100 ml flask at room temperature. The resulting mixture is heated at 80° C. for 10 hours. After said time has elapsed, a solution of 2.52 g of sodium bicarbonate (30 mmol) in 50 ml of water containing the self-assembly mixture therein is added little by little and stirred for 2 hours at 80° C.

2 g of montmorillonite and 1 g of rice straw are added to the final aqueous 1LIC/1DCD/1HCl/1NaHCO$_3$ mixture obtained and stirred for 2 hours at 80° C. The mixture of montmorillonite and straw may have been previously modified, forming an adobe which is grounded as particles with millimetric dimensions.

Example 8

Figure 2:
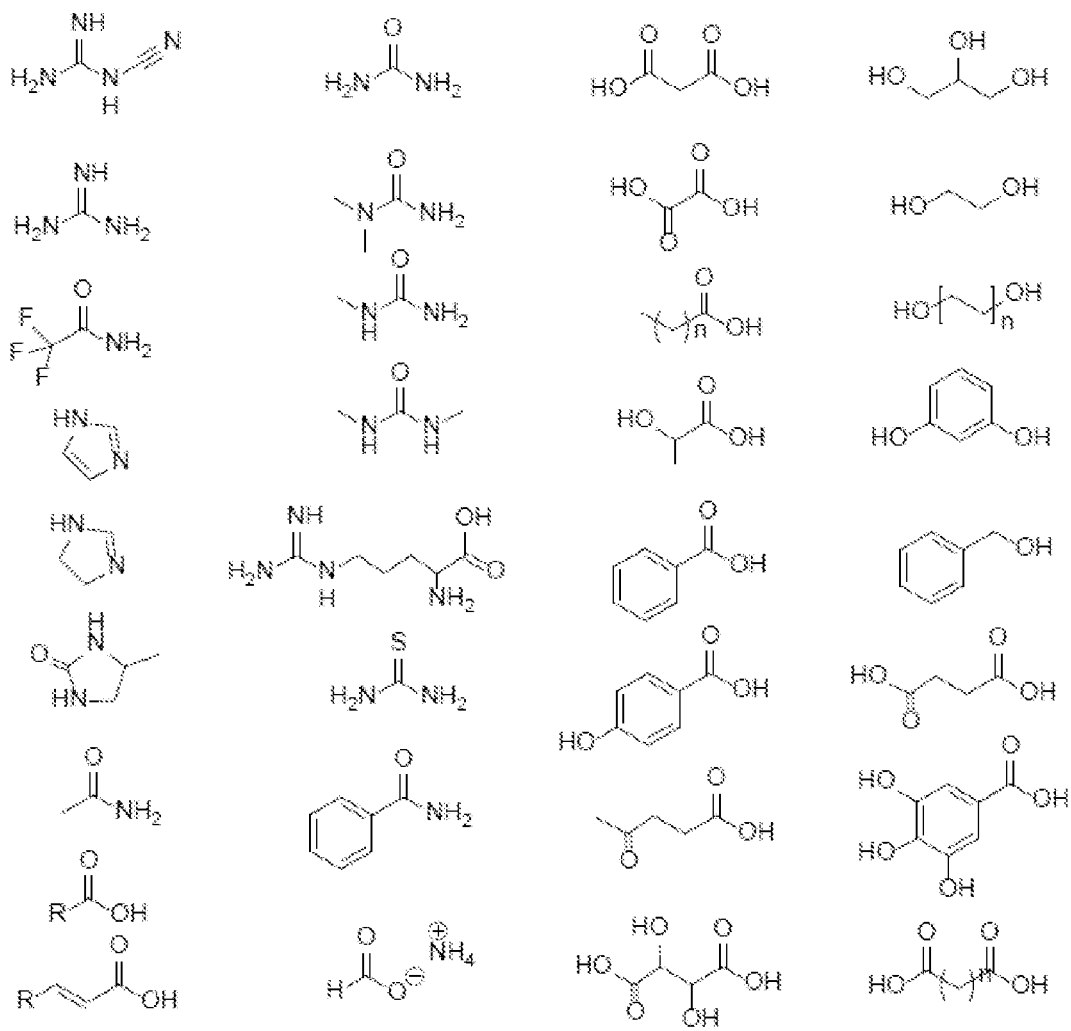

Formation of the self-assembly mixtures of lidocaine and urea, supported on montmorillonite. This is performed in the same manner as in Example 5 replacing the amount of dicyandiamide with 30 mmol (1.80 g) of urea. As an alternative to urea, any other compounds indicated in FIG. 2 acting as hydrogen donors can be used in the amount equivalent to 30 mmol. The resulting solid can be used directly or can be suitably modified for use thereof.

Example 9

Impregnation of the self-assembly mixtures of lidocaine and urea on straw. This is performed in the same manner as in Example 6 replacing the amount of dicyandiamide with 30 mmol (1.80 g) of urea. As an alternative to urea, any other compounds indicated in FIG. 2 acting as hydrogen donors can be used in the amount equivalent to 30 mmol. The resulting solid can be used directly or can be suitably modified for use thereof. Similarly to that indicated in Example 6, a synergistic effect as a result of the combination of the soluble organic compounds on the ground straw particles is observed when comparing the lack of retardant effect of 1:2 diluted solutions of the soluble compounds or the lidocaine- and urea-free straw suspension in an amount of 0.5 with the effect observed for the mixture of both.

Example 10

Impregnation of the mixtures of lidocaine and urea or another donor on adobe. This is performed in the same manner as indicated in Example 8 replacing the amount of dicyandiamide with 30 mmol (1.80 g) of urea. As an alternative to urea, any other compounds indicated in FIG. 2 acting as hydrogen donors can be used in the amount equivalent to 30 mmol. The adobe can be suitably formed by mixing clay and straw and this adobe is ground into particles with suitable dimensions before impregnation with the mixture of lidocaine and urea. The resulting solid can be used directly or can be suitably modified for use thereof.

Example 11

Formation of the self-assembly mixtures of betaine and urea with subsequent impregnation on montmorillonite. 15 mmol (2.30 g) of betaine hydrochloride (BETCl) and 30 mmol (1.80 g) of urea are introduced in a 100 ml flask at room temperature. The resulting mixture is heated at 80° C. for 5 hours. After said time has elapsed, a solution of 2.52 g of sodium bicarbonate (30 mmol) in 40 ml of water is added little by little into the flask containing the self-assembly mixture and stirred for 1 hour at 80° C. This aqueous solution can be used as a fire retardant and water can be evaporated to obtain the pure mixture. The combination of betaine and urea impregnated on montmorillonite exhibits the synergistic effect previously observed in Example 5, as deduced from the lack of retardant effect of the water-soluble organic compounds at a 1:2 dilution, of the 1 g montmorillonite suspension that is indeed observed for the combination of the soluble compounds with montmorillonite.

Alternatively, 2 g of montmorillonite is added to this aqueous solution containing 1BETCl/2Urea/2NaHCO$_3$ and stirred for 1 hour at 80° C. Montmorillonite can be ground and sieved prior to impregnation or the particulate material can be modified after the impregnation.

Example 12

Impregnation of betaine- and urea-based self-assembly mixtures on straw. This is performed in the same manner as in Example 11 in order to obtain the fire-retardant mixture in the indicated amounts. 1 g of rice straw previously ground to a particle size of about 1 millimetre is added to the final aqueous 1 BETCl/2Urea/2NaHCO$_3$ mixture. Seeds of shrubs in a percentage of 20% by weight can be added to this retardant-impregnated straw to favour the recovery of flora in the fire-damaged area.

Example 13

Impregnation of adobe nanoparticles consisting of montmorillonite and rice straw with a self-assembly mixture of betaine and urea neutralised with sodium bicarbonate. This is performed in the same manner as indicated in Example 11 for preparing a self-assembly mixture of betaine chloride and urea in a molar ratio of 1:2, together with sodium bicarbonate as a pH regulating buffer. 3 g of adobe previously ground and sieved to the sizes of 100-200 mesh are added to this mixture in dissolution, stirring for 2 hours at 80° C. and, after said time has elapsed, evaporating the water. The adobe is obtained by mixing 2 g of montmorillonite with 1 g of ground rice straw in 50 ml of water, stirring for 2 h at 80° C. and, after said time has elapsed, evaporating the water. The adobe thus obtained is ground and sieved into desired particle size.

Example 14

Formation of the self-assembly mixtures of betaine and dicyandiamide neutralised with sodium bicarbonate and the subsequent use thereof for impregnating montmorillonite. 20 mmol (3.07 g) of betaine hydrochloride (BETCl) and 20 mmol (1.68 g) of dicyandiamide (DCD) are introduced in a 100 ml flask at room temperature. The resulting mixture is heated at 80° C. for 5 hours in order to allow the spontaneous self-assembly of both molecules. After said time has elapsed, a solution of 1.68 g of sodium bicarbonate (20 mmol) in 40 ml of water is slowly added, stirring the solution for 1 hour at 80° C. 2 g of montmorillonite are added to the final aqueous 1BETCl/1DCD/1NaNCO$_3$ mixture and stirred for 1 hour at 80° C. Water is evaporated at 80° C. to obtain impregnated montmorillonite. This material can be pressed, ground, and sieved for suitable handling thereof.

Example 15

Impregnation of the self-assembly mixture of betaine and dicyandiamide on rice straw. Preparation of the self-assembly mixture of betaine hydrochloride and dicyandiamide neutralised with sodium bicarbonate is performed as indicated in Example 14. Likewise, impregnation is carried out following the method indicated in Example 14 substituting clay with 1 g of rice straw in the form of chips.

Example 16

Impregnation of the self-assembly mixture of betaine hydrochloride and dicyandiamide on adobe. This is performed in the same manner as indicated in Example 14 substituting 2 g of montmorillonite with 3 g of ground and sieved adobe between a particle size of 100 and 200 mesh. This tacky material can then be pressed and ground for suitable handling thereof.

Example 17

Formation of the self-assembly mixtures of betaine hydrochloride and dicyandiamide neutralised with ammonium bicarbonate. 20 mmol (3.07 g) of betaine hydrochloride (BETCl) and 20 mmol (1.68 g) of dicyandiamide (DCD) are introduced in a 100 ml flask at room temperature. The resulting mixture is heated at 80° C. for 3 hours. After said time has elapsed, a solution of 1.58 g of ammonium bicarbonate (20 mmol) in 30 ml of water is added little by little to the self-assembly mixture and the solution is stirred for 1 hour at 80° C. The final aqueous 1BETCl/1DCD/1(NH4)HCO$_3$ mixture with fire retardant effect obtained can be used directly, can be diluted in fresh water or seawater at a concentration of 10% or less. Alternatively, this self-assembly mixture can be used to impregnate solid supports such as those indicated in the preceding examples.

Example 18

Impregnation of the self-assembly mixture of betaine hydrochloride and dicyandiamide neutralised with ammonium bicarbonate on clays. This is performed in the same manner as in Example 17 and the aqueous solution of betaine hydrochloride and dicyandiamide neutralised with ammonium bicarbonate is used to impregnate 2 g of montmorillonite. The process is carried out by means of mechanical stirring for 1 h and slow water evaporation at 80° C. A similar method can be carried out to impregnate other types of natural clays, such as sepiolites, kaolin, halloysite, and vermiculite, among others.

Example 19

Impregnation of the self-assembly mixture of betaine hydrochloride and dicyandiamide neutralised with ammonium bicarbonate on rice straw. This is performed in the same manner as in Example 18 replacing montmorillonite with 1 g of rice straw. Alternatively, straws from other crops, such as tigernut straw, or another type of suitably treated agricultural waste in the form of chips, sawdust, or another type of particles, can be used as a retardant support.

Example 20

Impregnation of the self-assembly mixture of betaine hydrochloride and dicyandiamide neutralised with ammonium bicarbonate on adobe. This is performed in the same manner as in Example 18, replacing montmorillonite with 3 g of adobe in the form of particles. Adobe is prepared by means of any method such as the one indicated in Example 7 by mixing 2 g of montmorillonite or another micronised clay with 1 g of rice straw or straw from another crop and mixing same in an aqueous suspension, drying same by means of the evaporation of water, grinding same into particles, and sieving same.

Example 21

Formation of the self-assembly mixtures of glycine hydrochloride and dicyandiamide neutralised with potassium bicarbonate. 20 mmol (2.23 g) of glycine hydrochloride (GLY) and 20 mmol (1.68 g) of dicyandiamide (DCD) are introduced in a 100 ml flask at room temperature. The resulting mixture is heated at 80° C. for 3 hours. After said time has elapsed, another solution of 2 g of potassium bicarbonate (20 mmol) in 30 ml of water is slowly added to the formed solution and the mixture is stirred for 1 hour at 80° C. The final aqueous solution formed by 1GLY/1DCD/1HCl/1KHCO$_3$ can be concentrated by means of the evaporation of water at 80° C. or can be used diluted at a concentration of between 5 and 20% by weight of water.

Example 22

Impregnation of the self-assembly mixture of glycine hydrochloride and dicyandiamide on montmorillonite or silicates. This is performed in the same manner as in Example 21, adding 2 g of montmorillonite or of another clay or natural or synthetic silicate to the self-assembly mixture of glycine hydrochloride and dicyanamide. The suspension is stirred for 1 hour at 80° C. After said time has elapsed, water is evaporated at 80° C. maintaining the mechanical stirring of the suspension, a sticky residue of the clay coated with the self-assembly mixture being obtained.

Example 23

Impregnation of the self-assembly mixture of glycine hydrochloride and dicyandiamide on straw from agricultural crops. This is performed in the same manner as in Example 22, substituting montmorillonite with 1 g of rice straw or straw from another agricultural crop or with chips or sawdust from biomass waste.

Example 24

Impregnation of the self-assembly mixture of glycine hydrochloride and dicyandiamide on adobe. This is performed in the same manner as in Example 22, substituting montmorillonite with 3 g of adobe prepared as indicated in Example 7.

Example 25

Formation of the self-assembly mixtures of lidocaine and glycerol. 20 mmol (4.69 g) of lidocaine (LIC), 20 mmol (1.46 ml) of glycerol (GLC, average molecular weight 10,000), and 30 mmol (0.73 g) of hydrochloric acid are introduced in a 100 ml flask at room temperature. The resulting mixture is heated at 80° C. for 6 hours. After said time has elapsed, the solution is neutralised by means of slowly adding 2 g of potassium bicarbonate (20 mmol) in 40 ml of water. The solution is stirred for 2 hours at 80° C. The final aqueous 1LIC/1GLC/1HCl/1KHCO$_3$ mixture can be used directly, can be diluted at a percentage of between 5 and 20% by weight, or can be concentrated by means of the evaporation of water at 80° C. under mechanical stirring.

Example 26

Impregnation of the self-assembly mixture of lidocaine and glycerol on montmorillonite or silicates. This is performed in the same manner as indicated in Example 25. Upon obtaining the neutralised aqueous 1LIC/1GLC/1HCl/1KHCO$_3$ solution, 2 g of montmorillonite or of another natural clay or natural or synthetic silicate are added to this solution and the suspension is mechanically stirred for 2 hours at 80° C. Then, the complete evaporation of water is performed by means of heating at 80° C. under constant mechanical stirring.

Example 27

Impregnation of the self-assembly mixture of lidocaine and glycerol on rice straw. This is performed in the same manner as in Example 26, substituting montmorillonite with 1 g of rice straw or straw from another crop or sawdust or chips from the biomass and the suspension is stirred at 80° C. under constant mechanical stirring until the complete evaporation of water.

Example 28

Impregnation of the self-assembly mixture of lidocaine and glycerol on adobe. This is performed in the same manner as in Example 26, replacing montmorillonite with 3 g of adobe. Adobe can be prepared as indicated in Example 7.

Example 29

Obtaining coloured solids with fire retardant properties by means of impregnating adobe with a self-assembly mixture of lidocaine and glycerol. This is performed in the same manner as in Example 28, but 0.016 g of commercial colourant PureMarin® are added to the 1LIC/1GLC/1HCl/1KHCO$_3$ self-assembly solution and the solution is homogenised for 3 hours at 80° C. before adding 3 g of adobe.

Example 30

Coloured sample with fire retardant effect obtained by means of impregnating adobe with the self-assembly mixture of the (phenylmethyl)triphenylphosphonium chloride and glycerol. 20 mmol (7.77 g) of (phenylmethyl)triphenylphosphonium chloride (BfCl) and 20 mmol (1.46 ml) of glycerol (GLC) are introduced in a 100 ml flask at room temperature. The resulting mixture is heated at 80° C. for 5 hours. After said time has elapsed, a solution of 2 g of potassium bicarbonate (20 mmol) in 60 ml of water is slowly added and the solution is stirred for 1 hour at 80° C. 3 g of adobe prepared as indicated in Example 7 and 0.016 g of commercial colourant PureMarin® are added to the final aqueous 1BfCl/1GLC/1KHCO$_3$ solution and the suspension is mechanically stirred at 80° C. for the time sufficient to achieve the complete evaporation of water.

Example 31

Coloured sample with fire retardant effect obtained by means of impregnating adobe with the self-assembly mixture of glycine and glycerol. 20 mmol (1.5 g) of glycine (Gly) and 20 mmol (1.46 ml) of glycerol (GLC, average molecular weight 10,000) are introduced in a 100 ml flask at room temperature. The resulting mixture is heated at 80° C. for 5 hours. After said time has elapsed, a solution of 2 g of potassium bicarbonate (20 mmol) in 60 ml of water is slowly added and the solution is stirred for 1 hour at 80° C. 3 g of adobe prepared as indicated in Example 7 and 0.016 g of commercial colourant PureMarin® are added to the aqueous mixture made up of 1Gly/1GLC/1KHCO$_3$. The suspension is mechanically stirred at 80° C. until achieving the complete evaporation of water, with a sticky residue with fire retardant properties being obtained.

Example 32

Formation of the self-assembly mixtures of ammonium formate and urea. 60 mmol (3.78 g) of ammonium formate (FDA) and 60 mmol (3.60 g) of urea are introduced in a 50 ml flask at room temperature. The resulting mixture is heated at 80° C. for 12 h. After said time has elapsed, the viscous 1FDA/1Urea mixture which, when cooled, becomes solid at room temperature is obtained. This mixture with fire retardant effect can be diluted in water between 5 and 50% by weight or can be used to impregnate solid supports such as clays, natural or synthetic silicates, biomass waste, among others. Moreover, a colourant which allows the position of the mixture to be geographically localised can be added.

Example 33

Formation of the self-assembly mixtures of ammonium formate and dicyandiamide. 60 mmol (3.78 g) of ammonium formate (FDA) and 60 mmol (5.04 g) of dicyandiamide (DCD) are introduced in a 50 ml flask at room temperature. The resulting mixture is heated at 80° C. for 12 h. After said time has elapsed and upon cooling at room temperature, the solid 1FDA/1DCD mixture is obtained. This mixture with fire retardant effect can be diluted in water between 5 and 50% by weight for use thereof or can be used to impregnate solid supports such as those indicated in Example 32.

Example 34

Formation of the self-assembly mixtures of ammonium formate and glycine. 60 mmol (3.78 g) of ammonium formate (FDA) and 60 mmol (4.50 g) of glycine (GLY) are introduced in a 50 ml flask at room temperature. The resulting mixture is heated at 80° C. for 12 h. After said time has elapsed, the viscous 1FDA/1GLY mixture which, when cooled, becomes solid at room temperature is obtained. This mixture with fire retardant effect can be diluted in water between 5 and 50% by weight for use thereof or can be used to impregnate solid supports such as those indicated in Example 32.

Example 35

Formation of the self-assembly mixtures of glycine and urea. 30 mmol (2.25 g) of glycine (GLY), 60 mmol (3.60 g) of urea, and 30 mmol (1.09 g) of hydrochloric acid (37%) are introduced in a 50 ml flask at room temperature. The resulting mixture is heated at 80° C. for 6 h. After said time has elapsed, the viscous 1LIC/2urea/1HCl mixture which becomes solid at room temperature (25° C.) due to the elimination of water under reduced pressure of 40 mm of Hg is obtained. This mixture with fire retardant effect can be diluted in water in a percentage of between 5 and 50% by weight or can be used to impregnate solid supports such as any of those which are indicated in the preceding examples.

Example 36

Formation of the self-assembly mixtures of glycine and dicyandiamide. 30 mmol (2.25 g) of glycine (GLY), 30 mmol (2.52 g) of dicyandiamide (DCD), and 60 mmol (2.18 g) of hydrochloric acid are introduced in a 50 ml flask at room temperature. The resulting mixture is heated at 80° C. for 7 hours. After said time has elapsed, the viscous 1LIC/1DCD/2HCl mixture having an approximate pH of between 1 and 3 is obtained. This mixture with fire retardant effect can be diluted in water between 5 and 50% by weight for use thereof or can be used to impregnate solid supports such as those indicated in Example 32.

The invention claimed is:

1. A pyrophosphate-free mixture with fire retardancy, consisting of a thermally stable mixture of non-polymer organic components, wherein:
   a. a first compound of the mixture acts as a hydrogen-bridge donor, wherein the hydrogen-bridge donor compound is selected from a group consisting of dicyandiamide, urea, glycerol, guanidine, 1,1-dimethylurea, oxalic acid, ethylene glycol and derivatives, trifluoroacetamide, 1-methylurea, imidazole, 1,3-dimethylurea, lactic acid, resorcinol, 2-imidazoline, arginine, benzoic acid, benzyl alcohol, propylene urea, thiourea, 4-hydroxybenzoic acid, succinic acid, acetamide, benzamide, levulinic acid, gallic acid, ammonium formate, tartaric acid, malonic acid and derivatives, adipic acid, oleic acid, linoleic acid, stearic acid, trimyristin, citric acid and isocitric acid, as well as any of the combinations thereof;
   b. a second compound of the mixture acts as a hydrogen-bridge acceptor, wherein the hydrogen-bridge acceptor compound is selected from a group consisting of lidocaine or an ester-type derivative, proline, histidine, nicotinic acid, (phenylmethyl)triphenylphosphonium chloride, alanine, methyltriphenylphosphonium bromide, glycine, ethanolamine, and betaine, as well as any of the combinations thereof; and
   c. water, in a percentage comprised between 50% and 95% of the total weight of the mixture,
   wherein the molar ratio of the hydrogen-bridge donor compound and the hydrogen-bridge acceptor compound varies from 1:5 to 5:1, and
   wherein the hydrogen-bridge donor compound and the hydrogen-bridge acceptor compound are self-assembled by strong hydrogen bonds.

2. A preparation method for preparing the mixture according to claim 1, consisting of intimately mixing the first compound of the mixture acting as a hydrogen-bridge donor, the second compound of the mixture acting as a hydrogen-bridge acceptor, and water.

3. A method of using the mixture according to claim 1, as a fire retardant to extinguish a forest fire by applying said mixture to said fire.

* * * * *